US005846623A

United States Patent [19]
Denny

[11] Patent Number: 5,846,623

[45] Date of Patent: Dec. 8, 1998

[54] ADHESIVE LABEL/LEAFLET ASSEMBLIES

[75] Inventor: Barry Douglas Denny, Bury St. Edmunds, United Kingdom

[73] Assignee: Denny Bros Printing Limited, Suffolk, United Kingdom

[21] Appl. No.: 648,697

[22] Filed: May 16, 1996

[30] Foreign Application Priority Data

May 16, 1995 [GB] United Kingdom .................. 9509880

[51] Int. Cl.[6] ................................ B32B 3/00; G09F 3/00

[52] U.S. Cl. ................................ 428/42.3; 281/2; 281/5; 283/81; 428/40.1; 428/41.7; 428/41.8; 428/41.9; 428/42.1; 428/42.2; 428/43

[58] Field of Search ................................ 428/40.1, 41.7, 428/41.8, 41.9, 42.1, 42.2, 42.3, 43; 283/81; 281/2, 5

[56] References Cited

U.S. PATENT DOCUMENTS

| | | | |
|---|---|---|---|
| 4,744,591 | 5/1988 | Instance | 428/40.1 |
| 5,127,676 | 7/1992 | Bockairo | 428/40.1 |
| 5,605,730 | 2/1997 | Treleaven | 428/40.1 |

FOREIGN PATENT DOCUMENTS

| | | |
|---|---|---|
| 0 304 242 | 2/1989 | European Pat. Off. . |

*Primary Examiner*—Nasser Ahmad
*Attorney, Agent, or Firm*—Wenderoth, Lind & Ponack, L.L.P.

[57] ABSTRACT

A carrier web 10 has a plurality of leaflets 12 on its upper surface. Overlying each of the leaflets 12 is a web 21 which has a printable upper surface and adhesive on its rear surface for adhering to the leaflets 12. The web 21 includes strips 23 which extend beyond opposing edges of each leaflet 12 and which adhere directly to the carrier web 10. The transverse width of the strips 23 is less than the transverse width of the portion of the web 21 which overlies the leaflet 12. Shoulders 29 are thus provided in the web 21 at the junction of the strips 23 to the rest of the web 21. The shoulders 29 facilitate access to the leaflet beneath. Also as the upper surface of the web 21 is printable, users of the assemblies may apply their own information to the upper surface of the web such as bar code information or the price of the article to which the label/leaflet is applied.

13 Claims, 3 Drawing Sheets

ADHESIVE LABEL/LEAFLET ASSEMBLIES

BACKGROUND OF THE INVENTION

The present invention relates to adhesive label or leaflet assemblies and is concerned with the provision of an assembly whereby individual labels or leaflets can be detached from a carrier strip and attached by automatic machines to individual articles. The strip with its charge of labels or leaflets is conveniently adapted for storing in a roll.

EP-A-0304242 describes an adhesive leaflet assembly in which a flexible carrier strip has one of its faces coated with a release material. A plurality of leaflets are spaced from each other lengthwise of the strip and have adhesive sheet means overlying the leaflets. The adhesive sheet means adheres to a front cover of the leaflets and extends beyond the leaflet at both transverse edges to adhere directly to the carrier strip.

SUMMARY OF THE INVENTION

According to the present invention there is provided an adhesive leaflet assembly comprising a flexible carrier strip having one of its faces coated with a release material; a plurality of leaflets spaced from each other lengthwise of the strip each of which leaflets comprises a front sheet, a back sheet connected along a first transverse edge to the front sheet, and one or more further sheets disposed between the front and back sheets and connected thereto; and adhesive sheet means substantially overlying each leaflet, adherent to the front sheet thereof and extending beyond the leaflet to form portions beyond opposing transverse edges of the leaflet, the portions adhering directly to the one face of the carrier strip characterised in that a part of the adhesive sheet means which substantially overlies the leaflet has a transverse width greater than the transverse width of at least one of the portions either side of the leaflet thereby forming at least one shoulder in the adhesive sheet means at or adjacent a transverse edge of the leaflet.

Preferably the adhesive sheet means has a printable upper surface. In this way an assembly is provided which can be printed on its outer face after the assembly has been made thereby enabling users of the assemblies to print their own sales information such as price or a bar code. Moreover, the presence of the shoulder in the adhesive sheet means enables the assembly to be opened more easily as the shoulder presents a weakened region along which the assembly will preferentially tear.

Preferably a line of perforations is provided parallel to the transverse edge of the leaflet extending from the shoulder which further improves the ease of opening of the assembly.

The adhesive sheet means may extend beyond the lengthwise extending edges of the leaflet to engage said coated face of the strip, so that the leaflet is wholly enclosed. Alternatively, a portion of the leaflet may be free of the adhesive sheet means so that it may more easily be grasped.

The adhesive sheet may be translucent or transparent but is preferably opaque.

The opposite edge of the back sheet remote from said first line may be adhesively tacked to the adhesive sheet means by positioning the second fold line beyond the free edge of the front sheet, or by cutting away parts of the free edge of the front sheet, e.g. at its corners, or by forming one or more holes in the front sheet adjacent its free edge so that the part or parts of said further sheet behind the hole or holes can adhere to the adhesive sheet means.

The terms “transversely” “transverse” and “longitudinally” are used herein to specify directions in relation to the carrier strip.

BRIEF DESCRIPTION OF THE DRAWINGS

Some embodiments of the invention will now be described by way of example with reference to the accompanying diagrammatic drawings in which.

DETAILED DESCRIPTION OF THE INVENTION

Figure 1:
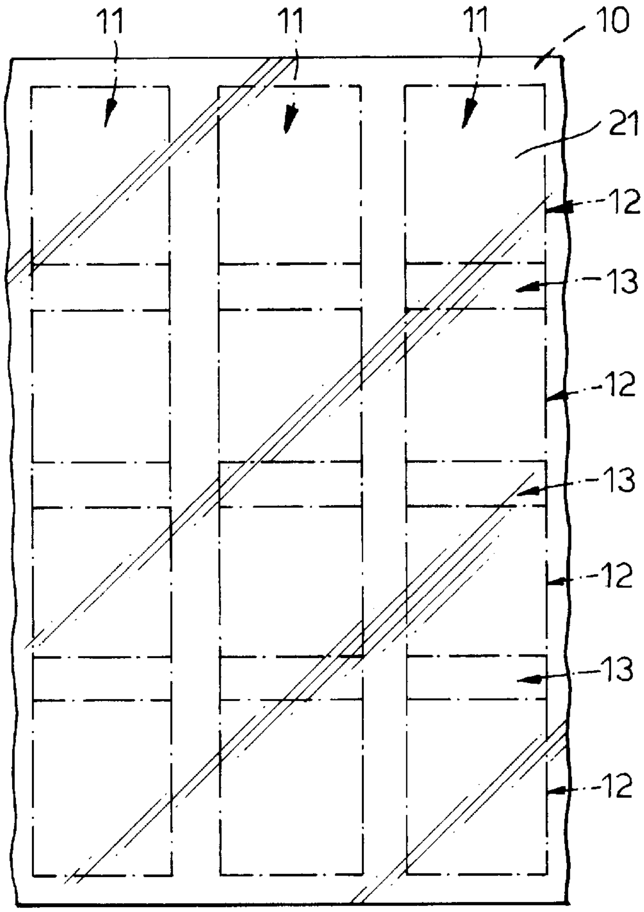
FIG. 1 shows the first stage in one method of manufacturing leaflets according to the present invention.

Referring now to FIG. 1 of the drawings, a carrier web 10 of paper having a release coating on its upper surface has placed on it a series of strips 11 of leaflets, each strip extending transversely of the web but terminating short of the side edges of the web, and being spaced lengthwise of the web from the next adjacent strips. Each strip comprises four leaflets 12 with between them, transversely of the web, bands 13 which serve to connect the leaflets 12 together at this stage for ease of handling but which are eventually to be discarded.

Figure 2:
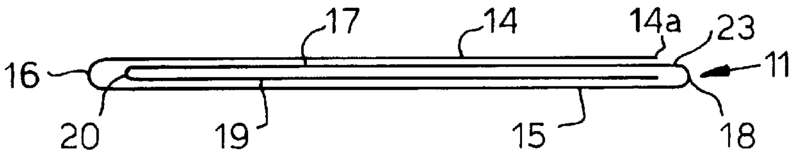
FIG. 2 is an edgewise view of a strip of the leaflets on an enlarged scale.

Each strip of leaflets is in one piece and comprises, as shown viewed edgewise transversely of the web 10 in FIG. 2, a front sheet 14, a back sheet 15 slightly longer than the front sheet and connected to the front sheet along a transverse fold line 16, first further sheet 17 connected to the back sheet 15 along a fold line 18, and a second further sheet 19 connected to the further sheet 17 along a fold line 20. Sheets 17 and 19 are disposed between the front and back sheets. Each leaflet may incorporate, in addition to matter identifying the article to which it is to be attached, instructions for use of the article, maker's guarantee, or other matter. An alternative leaflet is that of a booklet in which the front, back and further sheets of the leaflet are connected along a common spine.

A web 21 which has a printable upper face and is preferably opaque but may be transparent and has adhesive on its rear face is placed lengthwise over the carrier web 10 and the strips of leaflets 12, so that the front sheets 14 of the strips of leaflets and the exposed surface portions of the carrier web 10 adhere to it. Since the back sheet 15 is slightly longer than the front sheet 14 a narrow margin 22 of the sheet 17 projects beyond the free edge 14*a* of the front sheet 14 and becomes lightly tacked to the adhesive rear face of the web 21.

Figure 3:
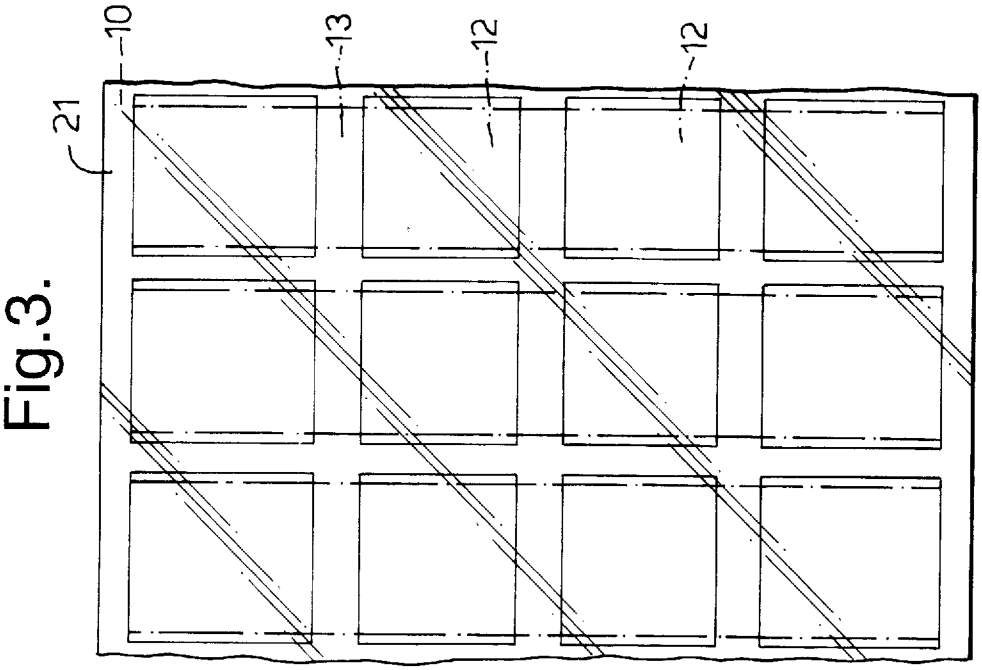
Figure 7:
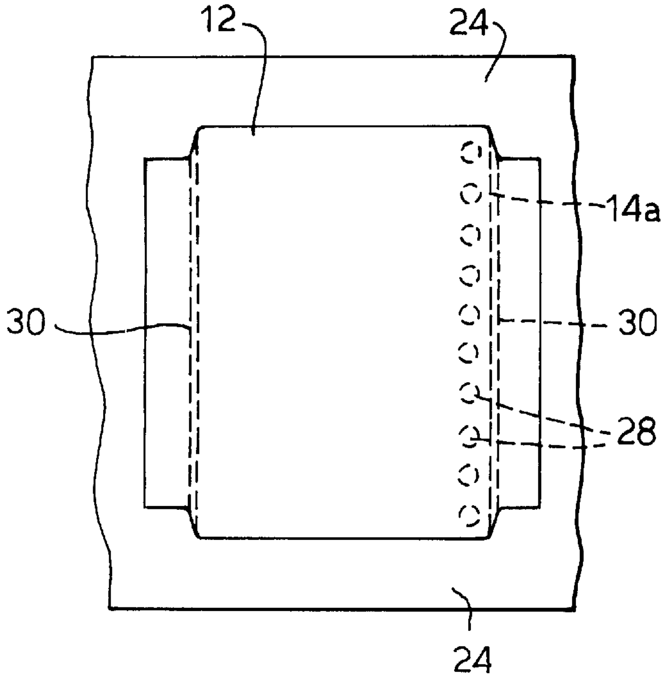

Referring now to FIG. 3 of the drawings, the assembly of the carrier web 10, strips 11 and web 21 is subjected to a die-cutting operation which cuts through the web 21 and the strip 11 but not the carrier web 10 and divides each strip into its four constituent leaflets and separates the band 13 from the leaflets 12, leaving each leaflet attached to the carrier web by two portions or strips 23 of the web extending beyond the fold lines 16, 18 of the leaflet. The cut web 21 is then separated from the carrier web, taking with it the bands 13, but leaving the area of the web material which overlies each leaflet, and is discarded. In the die-cutting operation the web 21 and strip 11 are cut so that the transverse width of the opposing strips 23 is less than the transverse width of that part of the web which overlies each of the leaflets 12. This in turn provides shoulders 29 in the web 21 at or adjacent to the transverse edges of the leaflet 12. In a separate die-cutting operation, which may be performed before, after or at the same time as the former die-cutting operation, a line of perforations 30 which extends widthwise is provided, substantially parallel to the transverse edges of the leaflet 12, from the shoulder 29 on one or both sides of the leaflet, as shown in FIG. 7. This facilitates access to the label or leaflet by the consumer.

In the drawings the leaflets are shown with four shoulders in the adhesive sheet means. It will be understood that alternatively the web and the leaflet may be cut so that one or more shoulders are provided. Also, in the drawings the web wholly covers the leaflets. In a further arrangement a portion of the leaflet, preferably along a longitudinal edge, is free of the web. This may be done by an additional die-cutting operation through the web alone which enables strips of the web which overlie a portion of the leaflet to be removed, or by applying varnish or other release material to the portion of the leaflet which will be free of the web.

Figure 5:
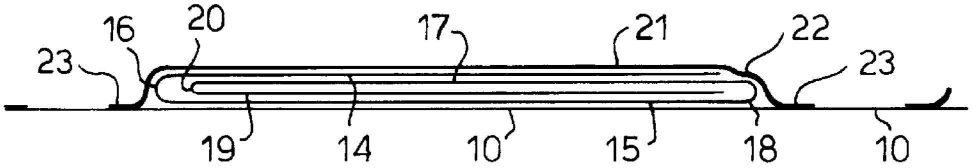
FIG. 5 is an edgewise view of the leaflets on the carrier web on an enlarged scale.
Figure 4:
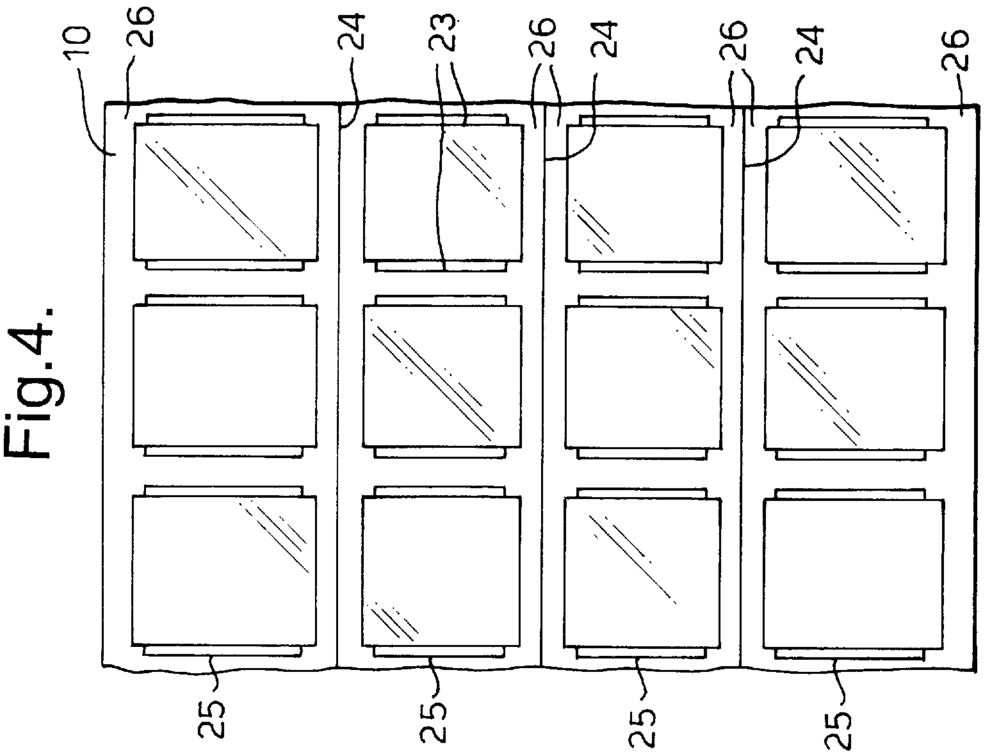
FIGS. 3 and 4 show two further stages in the method.

Subsequently the carrier web 10 carrying its rows of four leaflets is then slit lengthwise along the lines 24 shown in FIG. 4 into four strips 25 each carrying a succession of leaflets leaving exposed two lengthwise margins 26 of the strip of web 10 material at opposite sides of the leaflets. FIG. 5 shows the resulting arrangement viewed at right angles to the length of the web 10.

Each strip 25 with its leaflets 12 adherent thereto is intended to be rolled up for storage purposes. When the assembly comes to be used, the strip is led round a guide presenting a relatively small radius guide surface to the rear (uncoated) face of the strip 10 and the relative stiffness of sub-assembly of the leaflet 12 and sheet material causes the sub-assembly to become parted from the strip so that the adhesive rear face of the leading edge portion 23 of the panel of sheet material covering the leaflet is exposed. Simultaneously the article to which the subassembly is to be applied is moved past the guide at a matching speed to that of the strip 25 and a transfer device causes the sub-assembly to be transferred to the article as it peels from the strip.

The strip of labels or leaflets is advantageous in being well adapted for use in this way with automatic machines. The lengthwise margins or selvedges of the carrier strip, being devoid of any covering, are particularly suitable for use in such machines because the web or strip guides of the machines use the selvedge and can be snagged by a thick edge of a label or leaflet. The method of manufacture of the label or leaflet assemblies is advantageous in that the label or leaflet can be of any shape and its edges which extend lengthwise of the carrier strip need not be straight as long as the panel of sheet material has shoulders 29 at or adjacent to the transverse edges of the leaflet.

Figure 6:
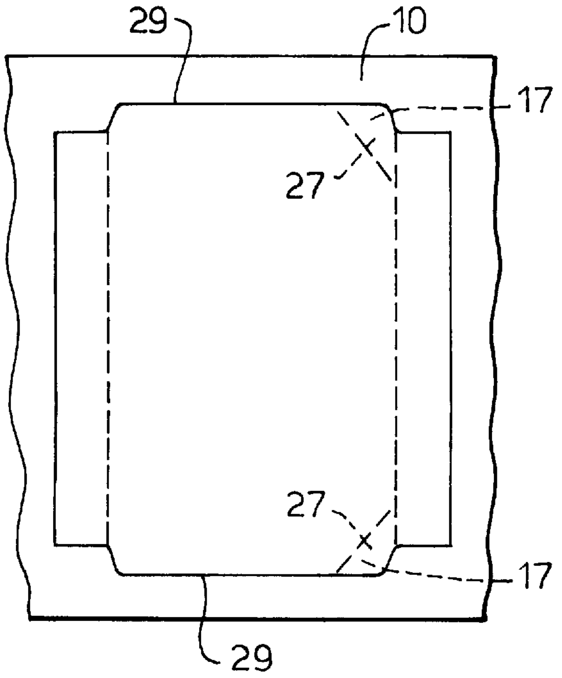
FIGS. 6 and 7 illustrate modifications of the method.

The light tacking of the sheet 17 to the adhesive rear face of the panel prevents the leaflet from opening during the transfer. Referring now to FIG. 6, the further sheet 17 can alternatively be arranged to become tacked to the adhesive face of the sheet by cutting off the corners of the free edge of the front sheet as shown at 27 or, as shown in FIG. 7, by forming holes 28 adjacent the free edge of the front sheet 16 so that the parts of the further sheet 17 so exposed become pressed against and adherent to the said adhesive face. In another alternative arrangement (not shown) the front face of the further sheet may be tacked to the rear face of the front sheet by a transversely extending line of adhesive or by the compression of the leaflet during storage.

With the leaflet/label assembly described the provision of the shoulder at or adjacent the leaflet edge enables the assembly to be opened more easily as the shoulder provides a weak point from which the web is most likely to tear. Also, as the web has a printable outer face, it is possible for users of the assembly to print their own information after the assembly has been made. Such information may be prices or a bar code.

Although not mentioned in the above description of the method of manufacturing the assembly, the assembly may also include a base label beneath the leaflet. The base label may be wholly obscured by the leaflet or may extend beyond the edges of the leaflet.

I claim:

1. An adhesive leaflet assembly comprising:

a flexible single layer carrier strip having longitudinal edges, a transverse width, and a face coated with a release material;

a plurality of leaflets longitudinally spaced along said flexible carrier strip, each of said leaflets including a front sheet, a back sheet connected along a first edge to said front sheet, and at least one sheet connected to and disposed between said front and back sheets; and a plurality of adhesive sheets substantially overlying and adhering to said front sheets of said leaflets, respectively, each of said adhesive sheets extending beyond a first pair of opposing peripheral edges of said respective leaflet to form portions which adhere directly to said face of said flexible carrier strip, wherein a part of each of said adhesive sheets, which substantially overlies said respective leaflet, has a width in a direction of the transverse width of said flexible carrier strip which is greater than a parallel width of at least one of said portions on either side of said respective leaflet thereby forming at least one laterally projecting step-shaped shoulder in said adhesive sheet at or adjacent an edge of said leaflet.

2. An assembly as claimed in claim 1, wherein said at least one shoulder is a discontinuity in an edge of each of said adhesive sheets, and said edge including said shoulder extends along one of said longitudinal edges of said flexible carrier strip and is not adhered to said flexible carrier strip.

3. An assembly as claimed in claim 1, wherein each of said adhesive sheets has four shoulders at or adjacent respective corners of said respective leaflet.

4. An assembly as claimed in claim 1, wherein each of said adhesive sheets includes a line of perforations extending from said at least one shoulder and substantially parallel to said opposing peripheral edges of said respective leaflet.

5. An assembly as claimed in claim 1, wherein each of said adhesive sheets has a printable upper surface.

6. An assembly as claimed in claim 1, wherein each of said adhesive sheets includes a pair of edges which extend in a direction of said longitudinal edges of said carrier strip, and said pair of edges are coincident with a second pair of opposing peripheral edges of said respective leaflet.

7. An assembly as claimed in claim 1, wherein a portion of said front sheet of each of said leaflets is free of said respective adhesive sheet.

8. An assembly as claimed in claim 1, wherein each of said adhesive sheets extends laterally beyond said respective leaflet at one or both of a pair of longitudinally extending edges of said respective leaflet.

9. An assembly as claimed in claim 1, wherein each of said leaflets is adhesively tacked to said respective adhesive sheet along a second edge of said back sheet by positioning a fold line connecting said second edge of said back sheet to said at least one sheet, disposed between said front and back sheets, beyond a free edge of said front sheet.

10. An assembly as claimed in claim 1, wherein each of said leaflets includes one or more holes formed in said front sheet adjacent a free edge thereof so that at least a part of said at least one sheet, disposed between said front sheet and said back sheet, adheres to said respective adhesive sheet.

11. The assembly as claimed in claim 1, wherein a free edge of said front sheet has a least a portion which is cut away so that said at least one sheet, disposed between said front and back sheets, adheres to said respective adhesive sheet.

12. The assembly as claimed in claim 1, wherein said adhesive sheets are opaque.

13. The assembly as claimed in claim 1, wherein each of said leaflets forms a booklet, and said front, back and at least one sheet, disposed between said front sheet and said back sheet, are connected along a spine.

* * * * *